US009894693B2

(12) United States Patent
Wang et al.

(10) Patent No.: US 9,894,693 B2
(45) Date of Patent: Feb. 13, 2018

(54) METHOD AND SYSTEM FOR BINDING MOBILE DEVICE WITH INTELLIGENT APPARATUS

(71) Applicant: GEMTEK TECHNOLOGY CO., LTD., Hsinchu (TW)

(72) Inventors: Wei Wang, Hsinchu (TW); Chung-Chiu Lai, Hsinchu (TW); Chia-Meng Chen, Hsinchu (TW)

(73) Assignee: GEMTEK TECHNOLOGY CO., LTD., Hsinchu (TW)

( * ) Notice: Subject to any disclaimer, the term of this patent is extended or adjusted under 35 U.S.C. 154(b) by 231 days.

(21) Appl. No.: 14/517,859

(22) Filed: Oct. 19, 2014

(65) Prior Publication Data

US 2015/0282223 A1 Oct. 1, 2015

(30) Foreign Application Priority Data

Mar. 27, 2014 (CN) .......................... 2014 1 0117448

(51) Int. Cl.
*H04W 76/02* (2009.01)
*H04W 12/04* (2009.01)

(52) U.S. Cl.
CPC ......... *H04W 76/021* (2013.01); *H04W 12/04* (2013.01); *H04W 76/023* (2013.01)

(58) Field of Classification Search
CPC .. H04W 12/04; H04W 76/021; H04W 76/023
See application file for complete search history.

(56) References Cited

U.S. PATENT DOCUMENTS

| 9,401,905 B1* | 7/2016 | Kowalski | H04L 63/08 |
| 2008/0319779 A1* | 12/2008 | Hughes | G06Q 30/06 |
| | | | 705/310 |
| 2015/0072653 A1* | 3/2015 | Fan | H04W 12/08 |
| | | | 455/411 |
| 2016/0234683 A1* | 8/2016 | Bone | H04L 63/062 |
| 2016/0248746 A1* | 8/2016 | James | H04L 61/1511 |
| 2017/0099647 A1* | 4/2017 | Shah | H04W 60/04 |

* cited by examiner

*Primary Examiner* — Lewis West
(74) *Attorney, Agent, or Firm* — Mark M. Friedman

(57) ABSTRACT

A method and system for binding mobile devices with intelligent apparatus are described. The method and system employ a mobile device to log in the server for acquiring user identification (UID) number. The mobile device fetches the information of an access point (AP), which can be identified by the first intelligent apparatus, and provides the UID number to the identified AP. The present invention characterizes in that the first intelligent apparatus disconnects itself from the mobile device, the first intelligent apparatus logs in the server by way of the identified AP, and the first intelligent apparatus uploads a first device identification code and the UID number to the server by way of the identified AP for generating the binding relationship between the first intelligent apparatus and the mobile device.

16 Claims, 6 Drawing Sheets

METHOD AND SYSTEM FOR BINDING MOBILE DEVICE WITH INTELLIGENT APPARATUS

FIELD OF THE INVENTION

The present invention relates to a method for binding electronic device and system thereof, and more particularly relates to a method and system for binding mobile device with intelligent apparatus thereof, wherein a server binds the mobile devices to the intelligent apparatus.

BACKGROUND OF THE INVENTION

Network services may be implemented by wireless connection without the network cables and thus many users gradually employ the wireless connection to access the network services. Moreover, with the rapid development of wireless network, the transmission rate provided by the wireless network becomes increasingly faster. Thus, many intelligent apparatuses, e.g. IP cameras, Internet of Things (IOT) products, or mobile devices, are capable of transmitting the data content by way of the wireless network.

However, if a plurality of new intelligent apparatuses need to be set simultaneously, it is required to configure one-by-one disadvantageously, which results in the complication of the configuration procedure of intelligent apparatuses and a time-consuming process.

Consequently, there is a need to develop a novel method and system for disadvantageously binding mobile devices to solve the problems of configuring intelligent apparatuses complicatedly and individually.

SUMMARY OF THE INVENTION

One objective of the present invention is to provide a method and system for binding mobile devices with intelligent apparatus thereof to solve the problems of configuring intelligent apparatuses complicatedly and individually.

Another objective of the present invention is to provide a method and system for binding mobile devices with intelligent apparatus thereof for rapidly and conveniently configuring a plurality of intelligent apparatuses by way of mobile device.

According to the above objectives, a first embodiment of the present invention sets forth a method for binding mobile device with intelligent apparatus, wherein the mobile device logs in a server for acquiring a user identification (UID) number, the mobile device fetches information of an access point (AP), which can be identified by a first intelligent apparatus, and the mobile device provides the UID number to the AP, the method comprising the steps of:

disconnecting the first intelligent apparatus from the mobile device and coupling the first intelligent apparatus to the server via the AP; and uploading a first device identification code of the first intelligent apparatus and the UID number to the server via the AP by using the first intelligent apparatus for generating a binding relationship between the first intelligent apparatus and the mobile device.

In one embodiment of the method, the binding relationship between the first device identification code and the UID number of the mobile device is written to a database of the server. For example, the UID number is a code defined and/or registered by user, and the code is unique or not unique number in the server.

In one embodiment of the method, the server returns the binding relationship to the first intelligent apparatus to provide a binding relationship feedback after the step of generating the binding relationship between the first intelligent apparatus and the mobile device.

In one embodiment of the method, the server sends a message to the mobile device to notify the mobile device of the binding relationship to be completed after the step of generating the binding relationship between the first intelligent apparatus and the mobile device.

In one embodiment of the method, the mobile device re-couples to the first intelligent apparatus before the mobile device acquires the UID number.

In one embodiment of the method, the mobile device re-couples to the first intelligent apparatus after the step of generating the binding relationship between the first intelligent apparatus and the mobile device.

In one embodiment of the method, the first intelligent apparatus is switched from a slave mode to a master mode after the step of re-coupling the first intelligent apparatus by the mobile device.

In one embodiment of the method, the first intelligent apparatus broadcasts a wireless local area network based on the master mode.

In one embodiment of the method, at least one second intelligent apparatus searches the wireless local area network for coupling the at least one second intelligent apparatus to the first intelligent apparatus after the first intelligent apparatus broadcasts the wireless local area network.

In one embodiment of the method, the at least one second intelligent apparatus is in the slave mode.

In one embodiment of the method, the first intelligent apparatus notifies the mobile device of confirming an initialization request of the at least one second intelligent apparatus after the step of searching the wireless local area network by at least one second intelligent apparatus for coupling the at least one second intelligent apparatus to the first intelligent apparatus.

In one embodiment of the method, the mobile device determines an initialization amount of the at least one second intelligent apparatus after the step of notifying the mobile device by the first intelligent apparatus of confirming the initialization request of the at least one second intelligent apparatus.

In one embodiment of the method, the first intelligent apparatus provides a connection information of the wireless local area network to the at least one second intelligent apparatus after the step of determining the initialization amount of the at least one second intelligent apparatus.

In one embodiment of the method, the mobile device in a local area network couples the mobile device to the first intelligent apparatus for acquiring a session authentication before the mobile device fetches the AP, which can be identified by the first intelligent apparatus.

In one embodiment of the method, the mobile device fetches an AP list of the AP, which can be identified by the first intelligent apparatus, based on the session authentication.

In one embodiment of the method, the mobile device couples to the first intelligent apparatus by one of a quick response (QR) encoding mechanism, an information scanning, an infrared transmitted/received communication and a voice encoding manner.

A second embodiment of the present invention sets forth a system for binding mobile device with intelligent apparatus, wherein the system comprises a server, a first intelligent apparatus having a first AP, and a mobile device; wherein the mobile device logs in the server for acquiring a UID number generated by the server and fetches an AP list having at least one second AP, which can be identified by the first intelligent apparatus; and wherein the mobile device designates one of at least one second AP in the AP list for providing the UID number and information of the server to the second AP, the system comprising:

wherein the first intelligent apparatus disconnects the mobile device from the first intelligent apparatus, and the first intelligent apparatus couples to the server by way of the second AP based on the information;

wherein the first intelligent apparatus uploads a first device identification code of the first intelligent apparatus and the UID number to the server by way of the designated second AP; and wherein the first intelligent apparatus submits a request to the server for binding the first intelligent apparatus with the mobile device to allow the server to generate a binding relationship between the first intelligent apparatus and the mobile device.

In one embodiment of the system, a database of the server further comprises the binding relationship between the first device identification code and the UID number.

In one embodiment of the system, the server returns the binding relationship to the first intelligent apparatus.

In one embodiment of the system, the server sends a message to the mobile device to notify the mobile device of the binding relationship to be completed.

In one embodiment of the system, the mobile device re-couples to the first intelligent apparatus when either the mobile device acquires the UID number or the server generates the binding relationship between the first intelligent apparatus and the mobile device.

In one embodiment of the system, the first AP of the first intelligent apparatus is switched from a slave mode to a master mode when the mobile device re-couples to the first intelligent apparatus for re-connecting first intelligent apparatus.

In one embodiment of the system, the first intelligent apparatus broadcasts a wireless local area network based on the master mode.

In one embodiment of the system, at least one second intelligent apparatus of the system searches the wireless local area network for coupling the first intelligent apparatus when the first intelligent apparatus broadcasts the wireless local area network.

In one embodiment of the system, the at least one second intelligent apparatus is in the slave mode.

In one embodiment of the system, the first intelligent apparatus notifies the mobile device of confirming an initialization request of the at least one second intelligent apparatus when the least one second intelligent apparatus searches the wireless local area network for coupling the first intelligent apparatus.

In one embodiment of the system, the mobile device determines an initialization amount of the at least one second intelligent apparatus after the first intelligent apparatus notifies the mobile device of confirming the initialization request of the at least one second intelligent apparatus.

In one embodiment of the system, the first intelligent apparatus provides a connection information of the wireless local area network to the at least one second intelligent apparatus when the initialization amount of the second intelligent apparatus is determined.

In one embodiment of the system, the mobile device couples to the first AP in the first intelligent apparatus for acquiring a session authentication by way of the first AP in a local area network.

In one embodiment of the system, the mobile device fetches an AP list of the AP, which can be identified by the first intelligent apparatus, based on the session authentication.

In one embodiment of the system, the mobile device couples to the first intelligent apparatus by one of a quick response (QR) encoding mechanism, an information scanning, an infrared transmitted/received communication and a voice encoding manner.

A third embodiment of the present invention sets forth a system for binding mobile device with intelligent apparatus, wherein the system comprises a first intelligent apparatus and a mobile device, and a binding relationship between the first intelligent apparatus and the mobile device is generated, the system further comprising:

wherein the first intelligent apparatus is in a master mode and broadcasts a wireless local area network based on the master mode; and wherein at least one second intelligent apparatus of the system couples to the first intelligent apparatus, and the first intelligent apparatus provides a connection information of the wireless local area network to the at least one second intelligent apparatus such that the at least one second intelligent apparatus generates the binding relationship between the first intelligent apparatus, the at least one second intelligent apparatus and the mobile device.

In one embodiment of the system, a first AP of the first intelligent apparatus is switched from a slave mode to the master mode.

In one embodiment of the system, the mobile device couples to the first intelligent apparatus when the binding relationship between the first intelligent apparatus and the mobile device is generated.

In one embodiment of the system, the at least one second intelligent apparatus is in a slave mode.

In one embodiment of the system, the first intelligent apparatus notifies the mobile device of confirming an initialization request of the at least one second intelligent apparatus when the least one second intelligent apparatus searches the wireless local area network for coupling the first intelligent apparatus, In one embodiment of the system, the mobile device determines an initialization amount of the at least one second intelligent apparatus after the first intelligent apparatus notifies the mobile device of confirming the initialization request of the at least one second intelligent apparatus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
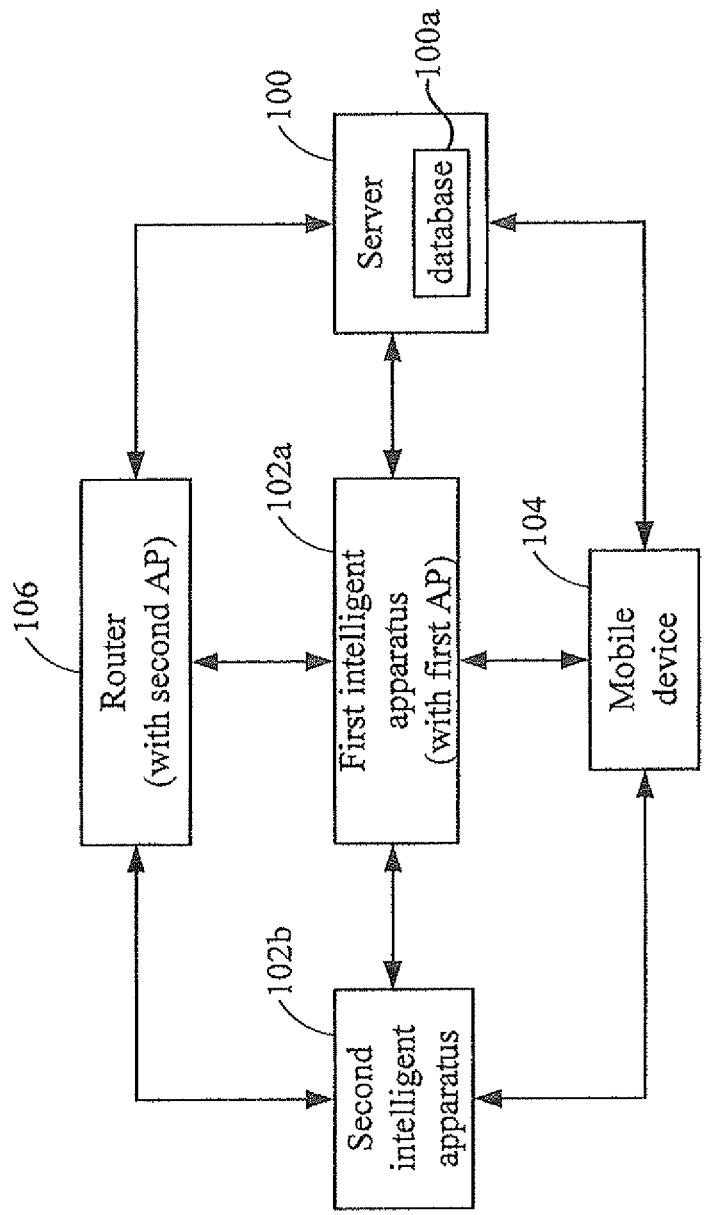
FIG. 1 is a schematic block diagram of a binding system according to a first embodiment of the present invention.
Figure 2:
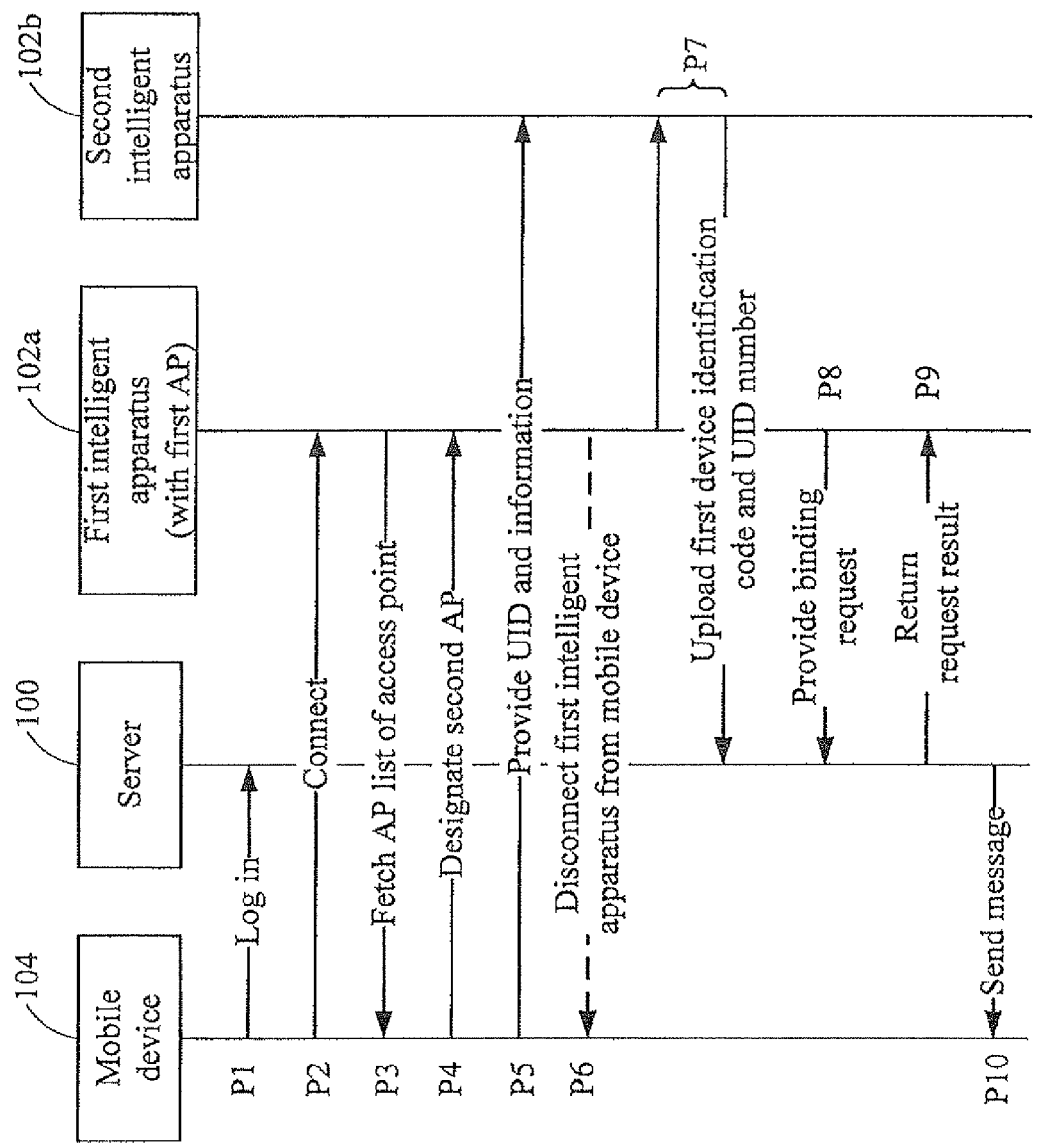
FIG. 2 is a schematic signal flow diagram of initializing an intelligent apparatus by way of a binding system according to the first embodiment of the present invention.

Referring to FIG. 1 and FIG. 2, FIG. 1 is a schematic block diagram of mobile device 104 and intelligent apparatus 102 in a binding system according to one embodiment of the present invention and FIG. 2 is a schematic signal flow diagram of initializing an intelligent apparatus 102 by way of a binding system according to a first embodiment of the present invention. The binding system includes a server 100, a first intelligent apparatus 102a, at least one second intelligent apparatus 102b (e.g. one second intelligent apparatus 102b herein), mobile device 104 and a router 106. The server 100 is coupled to the first intelligent apparatus 102a, the mobile device 104 and router 106 respectively. The mobile device 104 is coupled to the first intelligent apparatus 102a and the second intelligent apparatus 102b, respectively. The second intelligent apparatus 102b is coupled to first intelligent apparatus 102a and router 106, respectively. The first intelligent apparatus 102a is coupled to the router 106.

In one embodiment, the present invention employs the server 100 to form the binding relationship between the first intelligent apparatus 102a and mobile device 104 and the binding relationship is written to the database 100a of the server 100, e.g. remote cloud server and/or host unit, but not limited thereto. An access point (AP) is configured in the first intelligent apparatus 102a, such as computer, personal digital assistant (PDA), IP cameras and still digital cameras. The AP is compatible to Wireless Fidelity (Wi-Fi), which refers to IEEE 802.11 protocol group for supporting local wireless communication network.

As shown in FIG. 1 and FIG. 2, during the process P1, the mobile device 104 couples to and logs in the server 100 for acquiring user identification (UID) number generated by the server 100 such that the UID number corresponds to the mobile device 104. For example, the UID number is a code defined and/or registered by user, and the code is unique or not unique number in the server 100. In one embodiment, the mobile device 104 utilizes the UID number to subscribe the related subject information of the Message Queue Telemetry Transport (MQTT).

In FIG. 1 and FIG. 2, during the process P2, the mobile device 104 couples to the first AP in the first intelligent apparatus 102a for acquiring a session authentication message by way of the first AP in the local area network. For example, the mobile device 104 couples to the first AP in the first intelligent apparatus 102a by way of Wi-Fi manner and logs in the first AP to acquire the session authentication or verification by way of website http://192.168.1.1 in the internal local area network. In various embodiments, the mobile device 104 couples to the first intelligent apparatus 102a by different ways, such as quick response (QR) encoding mechanism, information (e.g. password of the server 100, but not limited) scanning, infrared transmitted/received communication and/or voice encoding manner.

In FIG. 1 and FIG. 2, during the process P3, the mobile device 104 fetches AP list, which can be identified by the first intelligent apparatus, based on the session authentication or verification wherein the AP list includes the information of second AP. Further, the AP list also includes Service Set Identifier (SSID), encryption schemes, encryption keys and connection message of the second AP. The second AP may be a point node disposed in router 106 or an independent node. During the process P4, the mobile device 104 designates a second AP in the AP list and the designated second AP serves as an accessing node for externally coupling the server 100. During the process P5, the mobile device 104 provides UID number and information (e.g. password, but not limited) to the second AP.

As shown in FIG. 1 and FIG. 2, during the process P6, the first intelligent apparatus 102a disconnects itself from the mobile device 104 for disconnecting the signal coupling status between the first intelligent apparatus 102a and the mobile device 104. In other words, the term "disconnect" in the present invention means that the communication status between devices or apparatuses is temporarily interrupted or isolated in a predetermined time interval. For example, the first intelligent apparatus 102a disconnects itself from the mobile device 104 to make a Wi-Fi disconnection such that the first intelligent apparatus 102a and the mobile device 104 communicate with the server 100 by way of the designated second AP selectively.

In FIG. 1 and FIG. 2, during the process P7, the first intelligent apparatus 102a couples to the server 100 based on information (e.g. password, but not limited) by way of the designated second AP. The first intelligent apparatus 102a uploads a first device identification code of first intelligent apparatus 102a and the UID number to the server 100 by way of the designated second AP. During the process P8, the first intelligent apparatus 102a provides a request to the server 100 for binding first intelligent apparatus 102a with the mobile device 104 such that the binding relationship between the first intelligent apparatus and the mobile device is generated. In other words, the database 100a of the server 100 includes the binding relationship between a first device identification code and UID number for mapping the first intelligent apparatus 102a to the mobile device 104. That is, the present invention employs mobile device 104 to initialize the first intelligent apparatus 102a by way of the server 100.

As shown in FIG. 1 and FIG. 2, during the process P9, the server 100 returns the request result of the binding relationship to the first intelligent apparatus 102a. During the process P10, the server 100 sends the messages to the mobile device 104 to notify the mobile device 104 of the request result of the binding relationship. For example, the server 100 sends the completion of request result to the mobile device 104 based on MQTT protocol.

According to the aforementioned descriptions, the system of the present invention employs a mobile device 104 for acquiring a UID number in the server 100 and couples to the second AP designated by the first intelligent apparatus 102a. Thus, the first intelligent apparatus 102a disconnects itself from the mobile device 104 to make a Wi-Fi disconnection such that the first intelligent apparatus 102a and the mobile device 104 communicate with the server 100 by way of the designated second AP selectively for generating the binding relationship between first device identification code of first intelligent apparatus 102a and the UID number in the server 100 increase the connection safety.

Figure 3:
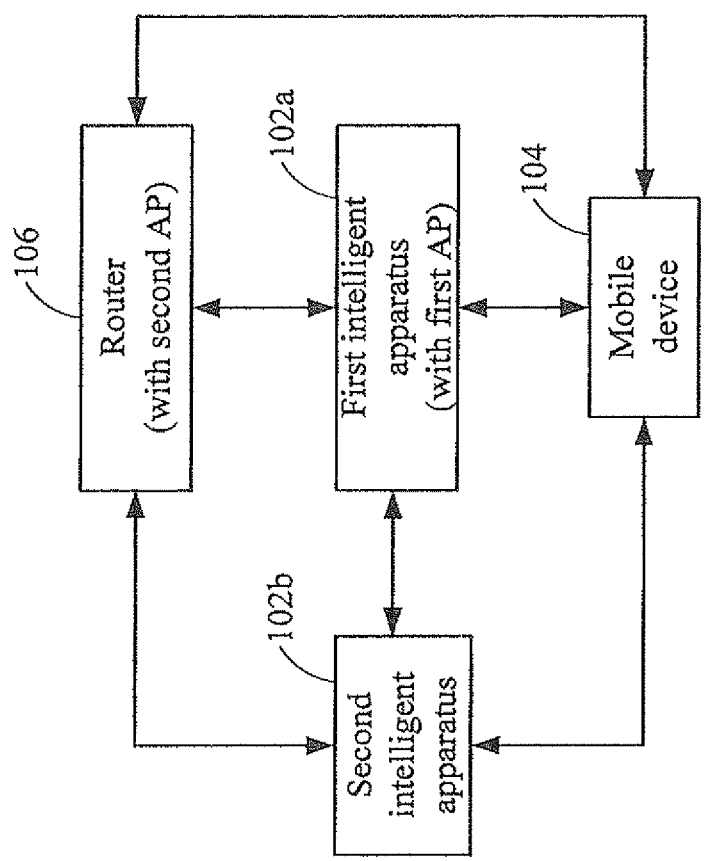
FIG. 3 is a schematic block diagram of a binding system according to a second embodiment of the present invention.
Figure 4:
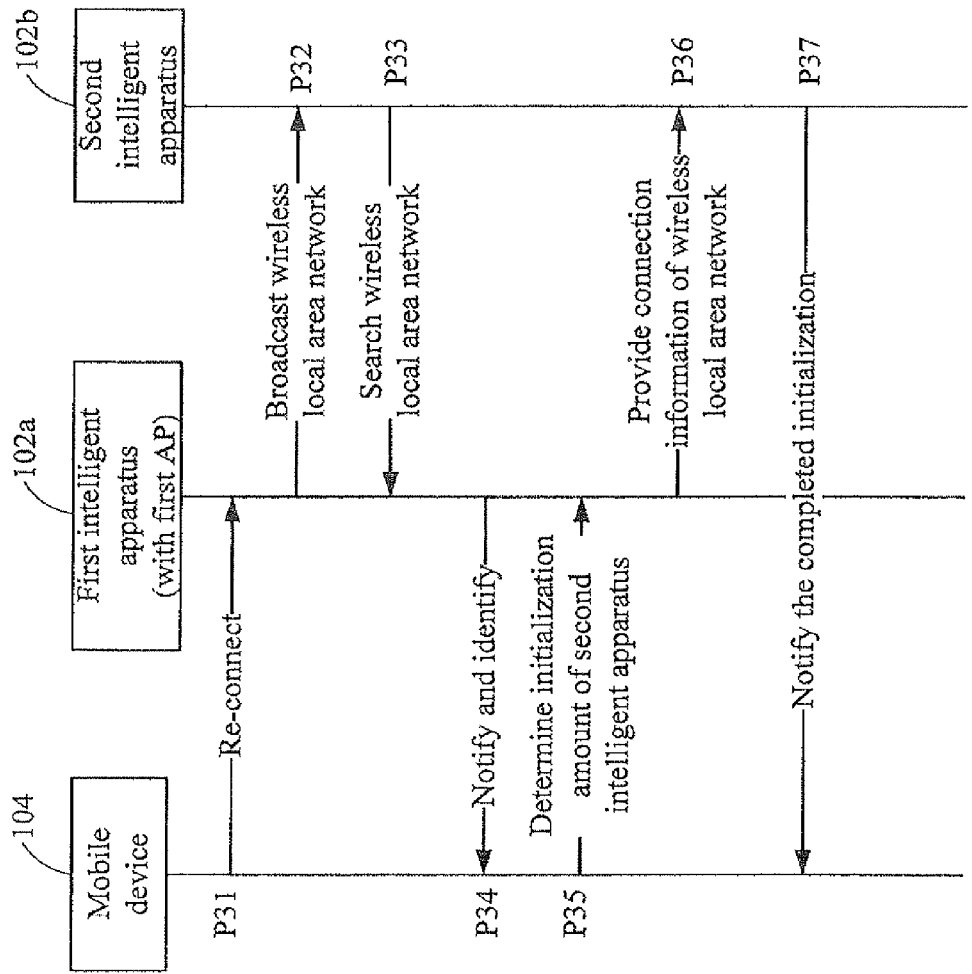
FIG. 4 is a schematic signal flow diagram of initializing a plurality of intelligent apparatuses by way of a binding system according to the second embodiment of the present invention.

Referring to FIG. 1, FIG. 3 and FIG. 4, FIG. 3 is a schematic block diagram of a binding system according to second embodiment of the present invention and FIG. 4 is a schematic signal flow diagram of synchronously initializing a plurality of second intelligent apparatuses 102b by way of a binding system according to the second embodiment of the present invention. In FIG. 3, the binding system includes a first intelligent apparatus 102a, at least one second intelligent apparatus 102b (e.g. one second intelligent apparatus 102b herein), mobile device 104 and a router 106. The mobile device 104 is coupled to the first intelligent apparatus 102a, the second intelligent apparatus 102b and the router 106, respectively. The first intelligent apparatus 102a is coupled to second intelligent apparatus 102b and the router 106. The second intelligent apparatus 102b is coupled to the router 106, respectively. The first intelligent apparatus 102a is in a master mode and broadcasts a wireless local area network based on the master mode. At least one second intelligent apparatus 102b of the system couples to the first intelligent apparatus 102a, and the first intelligent apparatus 102a provides a connection information of the wireless local area network to the at least one second intelligent apparatus 102b to allow the at least one second intelligent apparatus 102b to generate the binding relationship among the first intelligent apparatus 102a, the at least one second intelligent apparatus 102a and the mobile device 104.

The mobile device 104 utilizes the initialized first intelligent apparatus 102a in the first position to further configure the initialization of at least one second intelligent apparatus 102b, which are not initialized, in the second position. In other words, the binding system of the present invention employs the initialized first intelligent apparatus 102a to configure the un-initialized second intelligent apparatus 102b wherein one initialized first intelligent apparatus 102a serves as a relay device to synchronously "infect" at least one un-initialized second intelligent apparatus 102b for rapidly and conveniently configuring intelligent apparatuses by way of mobile device 104.

Specifically, the binding system uses one initialized first intelligent apparatus 102a to simultaneously configure a plurality of un-initialized second intelligent apparatuses 102b based on infection or diffusion mechanism to make a synchronized initialization for increasing the diffusion amount of the intelligent apparatuses. Further, after at least one second intelligent apparatuses 102b in the second position is initialized, the at least one initialized second intelligent apparatuses 102b continuously configures the un-initialized second intelligent apparatus 102b in the third positions. In this case, the mobile device 104 can communicate with the intelligent apparatuses disposed in different positions. Although the communication quality between the first intelligent apparatuses 102a in the first position and the second intelligent apparatuses 102b in the second position may be poor, however, the binding system of the present invention effectively utilizes the better communication quality between the second intelligent apparatus 102b in the second position and the second intelligent apparatuses 102b in the third position to complete the initialization configuration. Thus, the initialized second intelligent apparatuses 102b continuously configures the un-initialized second intelligent apparatus 102b in a distance extension manner to advantageously extend the configuration range of the intelligent apparatuses. Therefore, the mobile device 104 of the binding system uses at least one initialized first intelligent apparatus 102a to simultaneously configure a plurality of un-initialized second intelligent apparatuses 102b based on infection or diffusion mechanism for increasing the diffusion amount of the intelligent apparatuses and extending the configuration range of the intelligent apparatuses.

An initialized first intelligent apparatus 102a used to simultaneously configure a plurality of un-initialized second intelligent apparatuses 102b is described below in detail.

As shown in FIG. 1, FIG. 3 and FIG. 4, during the process P31, the mobile device 104 re-couples to the first intelligent apparatus 102a when the mobile device 104 disconnects from the first intelligent apparatus 102a such that one initialized first intelligent apparatus 102a serves as a relay device. In another embodiment, when a plurality of first intelligent apparatuses 102a are disposed in the wireless local area network, the mobile device 104 selects one of first intelligent apparatuses 102a to be a relay device. During the process P32, the first AP of the first intelligent apparatus 102a is switched from a slave mode to a master mode and the first intelligent apparatus 102a broadcasts the wireless local area network, e.g. SSID, based on the master mode when the mobile device 104 re-couples to the first intelligent apparatus 102a. In the present invention, the first intelligent apparatus 102a and the second intelligent apparatus 102b includes slave and master modes, and the first intelligent apparatus 102a and the second intelligent apparatus 102b can be switched between slave and master modes wherein the mobile device 104 determines the switching selection status of slave and master modes based on the initialization configuration request. In one preferred embodiment, when the mobile device 104 performs an initialization procedure, the first intelligent apparatus 102a playing an configuration role is in a master mode and the second intelligent apparatus 102b is in a slave mode. After the second intelligent apparatus 102h in the slave mode is completely configured, the second intelligent apparatus 102b is switched to master mode for continuously configuring the un-initialized intelligent apparatuses. In one embodiment, the master mode represents that the second intelligent apparatus 102b is awakened and the slave mode represents that the second intelligent apparatus 102b is not awakened. In another embodiment, the master mode represents that the second intelligent apparatus 102b is in client mode and the slave mode represents that the second intelligent apparatus 102b is in AP mode.

As shown in FIG. 1, FIG. 3 and FIG. 4, during the process P33, the at least one second intelligent apparatus 102b searches wireless local area network for coupling the first intelligent apparatus 102a when the first intelligent apparatus 102a broadcasts wireless local area network wherein the at least one second intelligent apparatus 102b are in slave mode. During the process P34, the first intelligent apparatus 102a notifies the mobile device 104 and the mobile device 104 confirms the initialization request of the at least one second intelligent apparatus 102b when the at least one second intelligent apparatus 102b searches wireless local area network for coupling the first intelligent apparatus 102a.

As shown in FIG. 1, FIG. 3 and FIG. 4, during the process P35, the mobile device 104 determines the initialization amount of the second intelligent apparatus 102b when the first intelligent apparatus 102a notifies the mobile device 104 to confirm the initialization request of the at least one second intelligent apparatus 102b. During the process P36, the first intelligent apparatus 102a provides the connection information of the wireless local area network to the at least one second intelligent apparatus 102b when the mobile device 104 determines the initialization amount of the second intelligent apparatus 102b wherein the connection information includes SSID, encryption schemes, encryption keys and related connection message of the first intelligent apparatus 102a. It should be noted that the SSID, encryption schemes, encryption keys and related connection message of the first intelligent apparatus 102a is the same as or different from SSID, encryption schemes, encryption keys and related connection message of the first intelligent apparatus 102a of the router 106.

As shown in FIG. 1, FIG. 3 and FIG. 4, during the process P37, the second intelligent apparatus 102b notifies the mobile device 104 of the complete initialization to be controllable such that the first intelligent apparatus 102a, the second intelligent apparatus 102b and the mobile device 104 are in the wireless local area network. In one preferred embodiment, after the second intelligent apparatus 102b is completely initialized, the first intelligent apparatus 102a and the second intelligent apparatus 102b are switched from the master mode to the slave mode.

Based on the aforementioned descriptions, the binding system of the present invention employs the mobile device 104 to configure the first intelligent apparatus 102a for initializing the un-initialized second intelligent apparatus 102b and for rapidly and conveniently configuring intelligent apparatuses by way of mobile device 104 to solve the problems of configuring intelligent apparatuses complicatedly and individually in the system.

Figure 5:
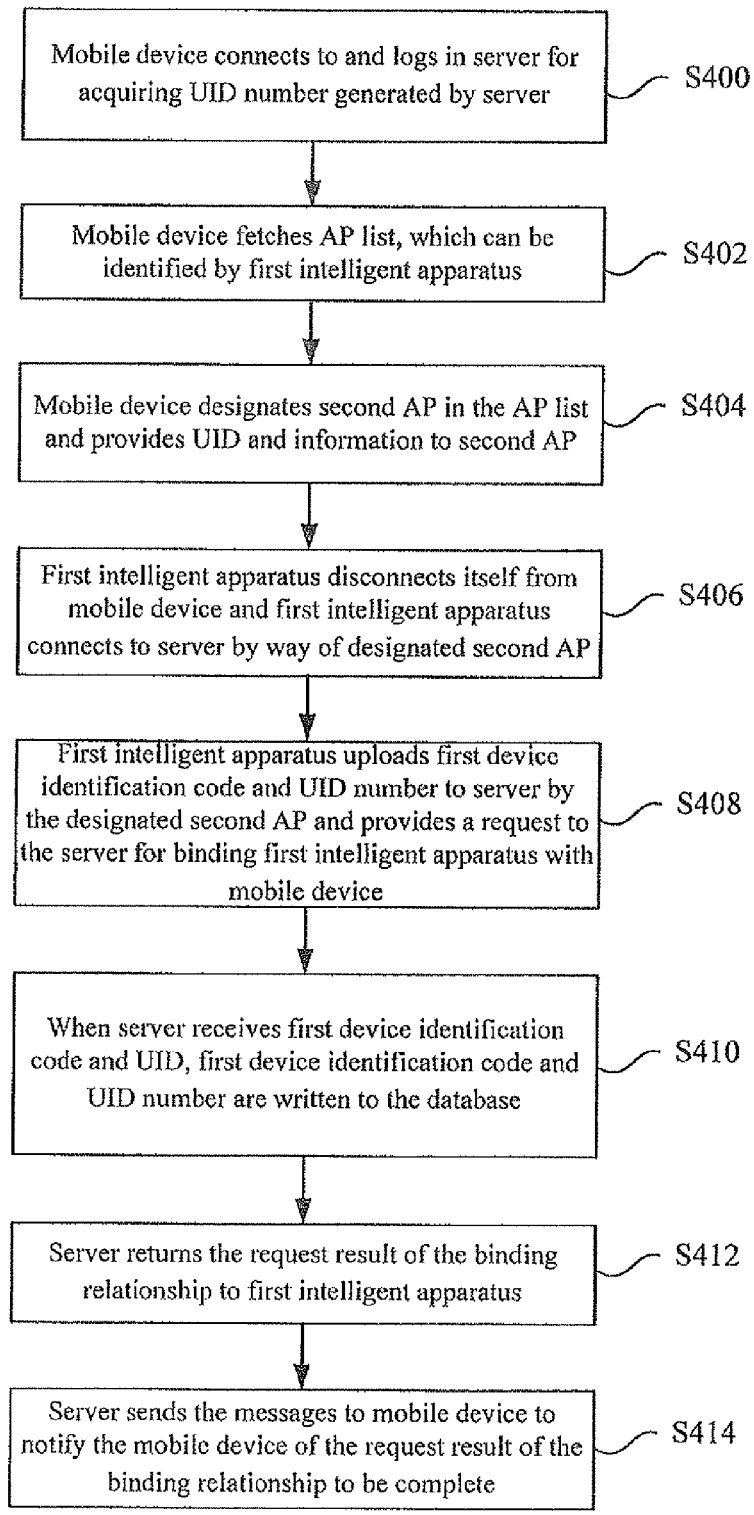
FIG. 5 is a schematic flow chart of initializing an intelligent apparatus by way of a binding system according to one embodiment of the present invention.

Referring to FIG. 1, FIG. 3 and FIG. 5, FIG. 5 is a schematic flow chart of initializing an intelligent apparatus by way of a binding system performing a binding method according to one embodiment of the present invention. The binding method is used to bind the mobile device 104 and the intelligent apparatuses 102a, 102b in a binding system which comprises a server 100, first intelligent apparatus 102a with a first AP, mobile device 104 and at least one second AP. The binding method comprises the following steps.

In step S400, the mobile device 104 couples to and logs in the server 100 for acquiring a UID number generated by the server 100.

In step S402, the mobile device 104 fetches AP list, which can be identified by the first intelligent apparatus, based on the session authentication or verification wherein the AP list includes the information of second AP.

In step S404, the mobile device 104 designates a second AP in the AP list and the designated second AP serves as an accessing node for externally coupling the server 100. The mobile device 104 provides UID number and information (e.g. password, but not limited) to the second AP which is identified by the first intelligent apparatus.

In step S406, the first intelligent apparatus 102a disconnects itself from the mobile device 104 and the first intelligent apparatus 102a couples to the server 100 by way of the designated second AP based on connection messages. For example, the first intelligent apparatus 102a disconnects itself from the mobile device 104 to make a Wi-Fi disconnection such that the first intelligent apparatus 102a and the mobile device 104 communicate with the server 100 by way of the designated second AP selectively.

In step S408, the first intelligent apparatus 102a uploads a first device identification code of first intelligent apparatus 102a and the UID number to the server 100 by way of the designated second AP and the first intelligent apparatus 102a provides a request to the server 100 for binding first intelligent apparatus 102a with the mobile device 104.

In step S410, when the server 100 receives the first device identification code and the UID number, the first device identification code of first intelligent apparatus 102a and the UID number of the mobile device 104 are written to the database 100a. In other words, the database 100a of the server 100 includes the binding relationship between a first device identification code and UID number for mapping the first intelligent apparatus 102a to the mobile device 104. That is, the present invention employs mobile device 104 to initialize the first intelligent apparatus 102a by way of the server 100.

In step S412, the server 100 returns the request result of the binding relationship to the first intelligent apparatus 102a.

In step S414, the server 100 sends the messages to the mobile device 104 to notify the mobile device 104 of the request result of the binding relationship to be completed.

Figure 6:
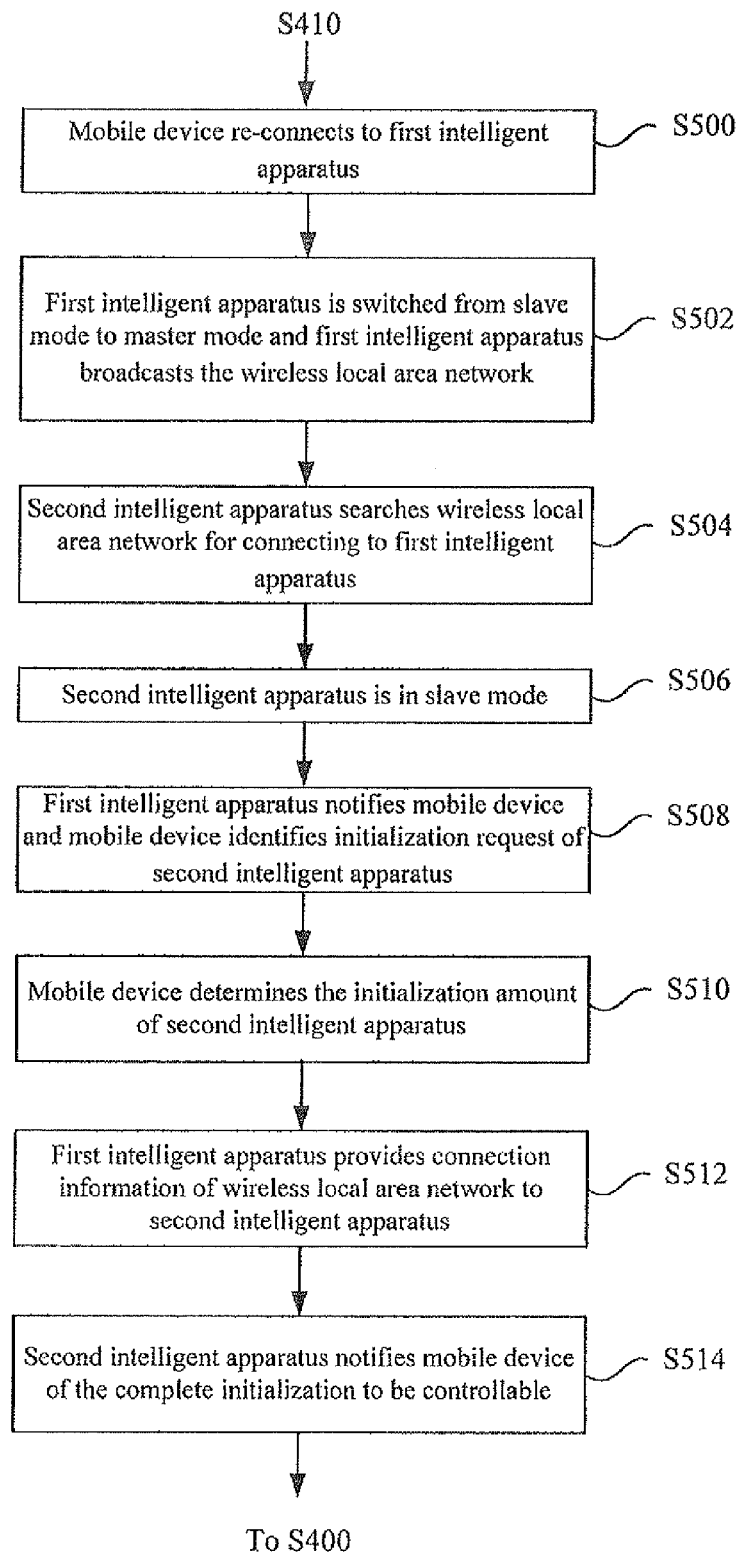
FIG. 6 is a schematic signal flow chart of initializing a plurality of intelligent apparatuses by way of a binding system according to one embodiment of the present invention.

Referring to FIG. 1, FIG. 3 and FIG. 6, FIG. 6 is a schematic signal flow chart of initializing a plurality of second intelligent apparatuses 102b by way of a binding system performing a binding method according to one embodiment of the present invention. The binding method is used to bind the mobile device 104 and the intelligent apparatuses 102a, 102b in a binding system which comprises a server 100, first intelligent apparatus 102a with a first AP, mobile device 104 and at least one second AP. The binding method comprises the following steps.

In step S500, the mobile device 104 re-couples to the first intelligent apparatus 102a when the mobile device 104 disconnects from the first intelligent apparatus 102a such that one initialized first intelligent apparatus 102a serves as a relay device.

In step S502, the first AP of the first intelligent apparatus 102a is switched from a slave mode to a master mode and the first intelligent apparatus 102a broadcasts the wireless local area network, e.g. SSID, based on the master mode when the mobile device 104 re-couples to the first intelligent apparatus 102a. In one embodiment, the master mode represents that the second intelligent apparatus 102b is awakened and the slave mode represents that the second intelligent apparatus 102b is not awakened. In another embodiment, the master mode represents that the second intelligent apparatus 102b is in client mode and the slave mode represents that the second intelligent apparatus 102b is in AP mode.

In step S504, the at least one second intelligent apparatus 102b searches wireless local area network for coupling the first intelligent apparatus 102a when the first intelligent apparatus 102a broadcasts wireless local area network wherein the at least one second intelligent apparatus 102b are in slave mode.

In step S506, the at least one second intelligent apparatus 102b is in slave mode.

In step S508, the first intelligent apparatus 102a notifies the mobile device 104 and the mobile device 104 confirms the initialization request of the at least one second intelligent apparatus 102b when the at least one second intelligent apparatus 102b searches wireless local area network for coupling the first intelligent apparatus 102a.

In step S510, the mobile device 104 determines the initialization amount of the second intelligent apparatus 102b when the first intelligent apparatus 102a notifies the mobile device 104 to confirm the initialization request of the at least one second intelligent apparatus 102b.

In step S512, the first intelligent apparatus 102a provides the connection information of the wireless local area network to the at least one second intelligent apparatus 102b when the mobile device 104 determines the initialization amount of the second intelligent apparatus 102b wherein the connection information includes SSID, encryption schemes, encryption keys and related connection message of the first intelligent apparatus 102a.

In step S514, the second intelligent apparatus 102b notifies the mobile device 104 of the complete initialization to be controllable such that the first intelligent apparatus 102a, the second intelligent apparatus 102b and the mobile device 104 are in the wireless local area network. In one preferred embodiment, after the second intelligent apparatus 102b is completely initialized, the first intelligent apparatus 102a and the second intelligent apparatus 102b are switched from the master mode to the slave mode.

In one embodiment, when combining the binding method in FIG. 5 and FIG. 6, the steps in FIG. 6 may be implemented before the step S400 of acquiring UID number in FIG. 5. In another embodiment, the steps in FIG. 6 may be implemented between the steps S410 and S412, i.e. after generating the binding relationship between the first intelligent apparatus 102a and the mobile device 104.

According to the above-mentioned descriptions, the present invention provides the method and system for binding mobile devices with intelligent apparatus for rapidly and conveniently configuring intelligent apparatuses by way of mobile device.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for binding mobile device with intelligent apparatus, wherein the mobile device logs in a server for acquiring a user identification (UID) number, the mobile device fetches information of an access point (AP), which can be identified by a first intelligent apparatus, and the mobile device provides the UID number to the AP, the method comprising the steps of:
   disconnecting the first intelligent apparatus from the mobile device and coupling the first intelligent apparatus to the server via the AP; and
   uploading a first device identification code of the first intelligent apparatus and the UID number to the server via the AP by using the first intelligent apparatus for generating a binding relationship between the first intelligent apparatus and the mobile device.

2. The method for binding mobile device with intelligent apparatus of claim 1, wherein the binding relationship between the first device identification code and the UID number of the mobile device is written to a database of the server.

3. The method for binding mobile device with intelligent apparatus of claim 1, further comprising a step of returning the binding relationship to the first intelligent apparatus by the server after the step of generating the binding relationship between the first intelligent apparatus and the mobile device.

4. The method for binding mobile device with intelligent apparatus of claim 1, further comprising a step of sending a message to the mobile device by the server to notify the mobile device of the binding relationship to be completed after the step of generating the binding relationship between the first intelligent apparatus and the mobile device.

5. The method for binding mobile device with intelligent apparatus of claim 1, further comprising a step of re-coupling the first intelligent apparatus by the mobile device before the mobile device acquires the UID number.

6. The method for binding mobile device with intelligent apparatus of claim 1, further comprising a step of re-coupling the first intelligent apparatus by the mobile device after the step of generating the binding relationship between the first intelligent apparatus and the mobile device.

7. The method for binding mobile device with intelligent apparatus of claim 5, further comprising a step of switching the first intelligent apparatus from a slave mode to a master mode after the step of re-coupling the first intelligent apparatus by the mobile device.

8. The method for binding mobile device with intelligent apparatus of claim 7, wherein the first intelligent apparatus broadcasts a wireless local area network based on the master mode.

9. The method for binding mobile device with intelligent apparatus of claim 8, further comprising a step of searching the wireless local area network by at least one second intelligent apparatus for coupling the at least one second intelligent apparatus to the first intelligent apparatus after the first intelligent apparatus broadcasts the wireless local area network.

10. The method for binding mobile device with intelligent apparatus of claim 9, wherein the at least one second intelligent apparatus is in the slave mode.

11. The method for binding mobile device with intelligent apparatus of claim 10, further comprising a step of notifying the mobile device by the first intelligent apparatus of confirming an initialization request of the at least one second intelligent apparatus after the step of searching the wireless local area network by at least one second intelligent apparatus for coupling the at least one second intelligent apparatus to the first intelligent apparatus.

12. The method for binding mobile device with intelligent apparatus of claim 11, further comprising a step of determining an initialization amount of the at least one second intelligent apparatus by the mobile device after the step of notifying the mobile device by the first intelligent apparatus of confirming the initialization request of the at least one second intelligent apparatus.

13. The method for binding mobile device with intelligent apparatus of claim 12, further comprising a step of providing a connection information of the wireless local area network to the at least one second intelligent apparatus by the first intelligent apparatus after the step of determining the initialization amount of the at least one second intelligent apparatus.

14. The method for binding mobile device with intelligent apparatus of claim 1, further comprising a step of coupling the mobile device to the first intelligent apparatus for acquiring a session authentication by way of the mobile device in a local area network before the mobile device fetches the AP, which can be identified by the first intelligent apparatus.

15. The method for binding mobile device with intelligent apparatus of claim 14, wherein the mobile device fetches an AP list of the AP, which can be identified by the first intelligent apparatus, based on the session authentication.

16. The method for binding mobile device with intelligent apparatus of claim 14, wherein during the step of coupling the mobile device to the first intelligent apparatus, the mobile device couples to the first intelligent apparatus by one of a quick response (QR) encoding mechanism, an information scanning, an infrared transmitted/received communication and a voice encoding manner.

* * * * *